United States Patent
Jäger et al.

(10) Patent No.: US 10,380,354 B2
(45) Date of Patent: Aug. 13, 2019

(54) METHOD AND SYSTEM FOR SAFEGUARDING DATABASE RELATIONS AGAINST UNAUTHORIZED ACCESS

(71) Applicant: UNISCON UNIVERSAL IDENTITY CONTROL GMBH, Munich (DE)

(72) Inventors: Hubert Jäger, Pullach (DE); Dau Khiem Nguyen, Munich (DE); Christos Karatzas, Munich (DE)

(73) Assignee: UNISCON UNIVERSAL IDENTITY CONTROL GMBH, Munich (DE)

( * ) Notice: Subject to any disclaimer, the term of this patent is extended or adjusted under 35 U.S.C. 154(b) by 246 days.

(21) Appl. No.: 15/235,398

(22) Filed: Aug. 12, 2016

(65) Prior Publication Data

US 2016/0350540 A1    Dec. 1, 2016

Related U.S. Application Data

(63) Continuation of application No. PCT/EP2015/052959, filed on Feb. 12, 2015.

(30) Foreign Application Priority Data

Feb. 12, 2014 (DE) .................. 10 2014 101 710

(51) Int. Cl.
G06F 16/22 (2019.01)
G06F 21/60 (2013.01)
G06F 21/62 (2013.01)

(52) U.S. Cl.
CPC ........ *G06F 21/602* (2013.01); *G06F 16/2272* (2019.01); *G06F 21/6227* (2013.01); *G06F 21/6254* (2013.01)

(58) Field of Classification Search
CPC ............ G06F 17/2247; G06F 17/246; G06F 17/30309; G06F 17/30424; G06F 3/04817; G06F 3/0484; G06F 16/219
See application file for complete search history.

(56) References Cited

U.S. PATENT DOCUMENTS 6,789,195 B1 *  9/2004  Prihoda ................. G06F 21/602
                                                 713/155
2009/0265788 A1 * 10/2009  Ehrenschwender ........................
                                                 G06F 21/6254
                                                 726/26

FOREIGN PATENT DOCUMENTS

DE        199 25 910 A1    2/2001
DE    10 2006 012 311 A1    9/2007

OTHER PUBLICATIONS

International Search Report for corresponding International Application No. PCT/EP2015/052959 dated Apr. 22, 2015.
Bouganim et al., "Chip-Secured Data Access: Confidential Data on Untrusted Servers", pp. 1-13, ResearchGate, Proceedings of the 28th VLDB Conference, Hong Kong, China, Jan. 2002.

* cited by examiner

*Primary Examiner* — Abiy Getachew
(74) *Attorney, Agent, or Firm* — Myers Wolin, LLC (57) ABSTRACT

A method is provided for safeguarding values of attributes of a data record that can be stored in a first relational database against unauthorized access, wherein a value of a foreign key attribute of the data record refers to a key for the first relation or for a second relation, and wherein the value of the foreign key attribute is stored in a mapping relation, the values of attributes of the data record that are not foreign key attributes are stored in the first relation, and the mapping relation is stored in a volatile data memory.

11 Claims, 4 Drawing Sheets

METHOD AND SYSTEM FOR SAFEGUARDING DATABASE RELATIONS AGAINST UNAUTHORIZED ACCESS

CROSS REFERENCE TO RELATED APPLICATIONS

This application is a continuation of International Application No. PCT/EP2015/052959, filed on Feb. 12, 2015, which claims priority to German Application No. 10 2014 101 710.2, filed Feb. 12, 2014, the contents of each of which are incorporated by reference herein.

TECHNICAL FIELD

The subject of the invention mentioned herein is a method that safeguards the value of foreign key attributes of a data record against unauthorized access and creates and/or recovers said foreign key attributes in a database's RAM. In addition, the invention constitutes a system that is aligned to protect a dataset's foreign key attribute value against unauthorized access and recovers said data in a given volatile memory.

BACKGROUND

It is common practice to encrypt data and/or datasets in a database. This is to prevent unauthorized access to the datasets stored in the database. However, the data in the database is encrypted through an encryption key known to the database provider and may also be decrypted, if necessary, by the database provider via decryption key. In other words, a database provider can access the data in the database anytime, even if it does not own the data. This constitutes a further drawback: the database provider can not only access datasets of individual relations (tables). If applicable, the provider can also access the connections between two or more relations and analyze them, in order to deduct information from the links, e.g. as to user behaviour. For example, a first relation might include personal and personally identifiable user data, while a second relation might reveal an e-mail account's master data. The first relation may include information (as foreign key to the second relation), that reveals to which mailbox the respective user has access in the second relation. The foreign key value is stored, along with the dataset to which it applies, in the database. I.e., foreign key values and non-decrypting attribute values constitute, with primary keys, as the case may be, individual datasets, that are stored in relations, i.e. tables.

Should, e.g., two users of a first relation have access to the same mailbox in a second relation, then the database provider can deduct that the two users are connected and possibly exchange information with this mailbox. Such additional information is also called metadata.

Consequently, mere database encryption does not prevent database providers against being able to access data or other meta-information that relations between two or more relations in the database yield.

Hence, the objective of present invention is to provide methods and systems, wherein unauthorized parties and database providers alike are effectively prevented from accessing metadata and information which may be deducted from connections between two or more database relations.

SUMMARY

According to the present invention, the herein mentioned objective is achieved via its procedures, the system, and a computer program product according to the independent claims.

Advantageous embodiments and further embodiments of the invention are set forth in the respective dependent claims.

A method is provided that protects the values of attributes of a dataset, that may be stored in a first relation of a database, which may be stored in a permanent memory, against unauthorized access, wherein a dataset's foreign key attribute value refers to a key of the first relation or second relation. The foreign key attribute value is stored in a mapping relation and the values of a number of attributes of a dataset, that are not foreign key attributes, are stored in the first relation, and the mapping relation is stored in a volatile memory.

Further variations of the method, as well as computer program products and systems implementing the method are described in more detail below.

BRIEF DESCRIPTION OF THE DRAWINGS

Invention details and features, as well as concrete design embodiments of said invention, unfold in the following description in connection with the illustrations that represent the following.

DETAILED DESCRIPTION

Figure 1:
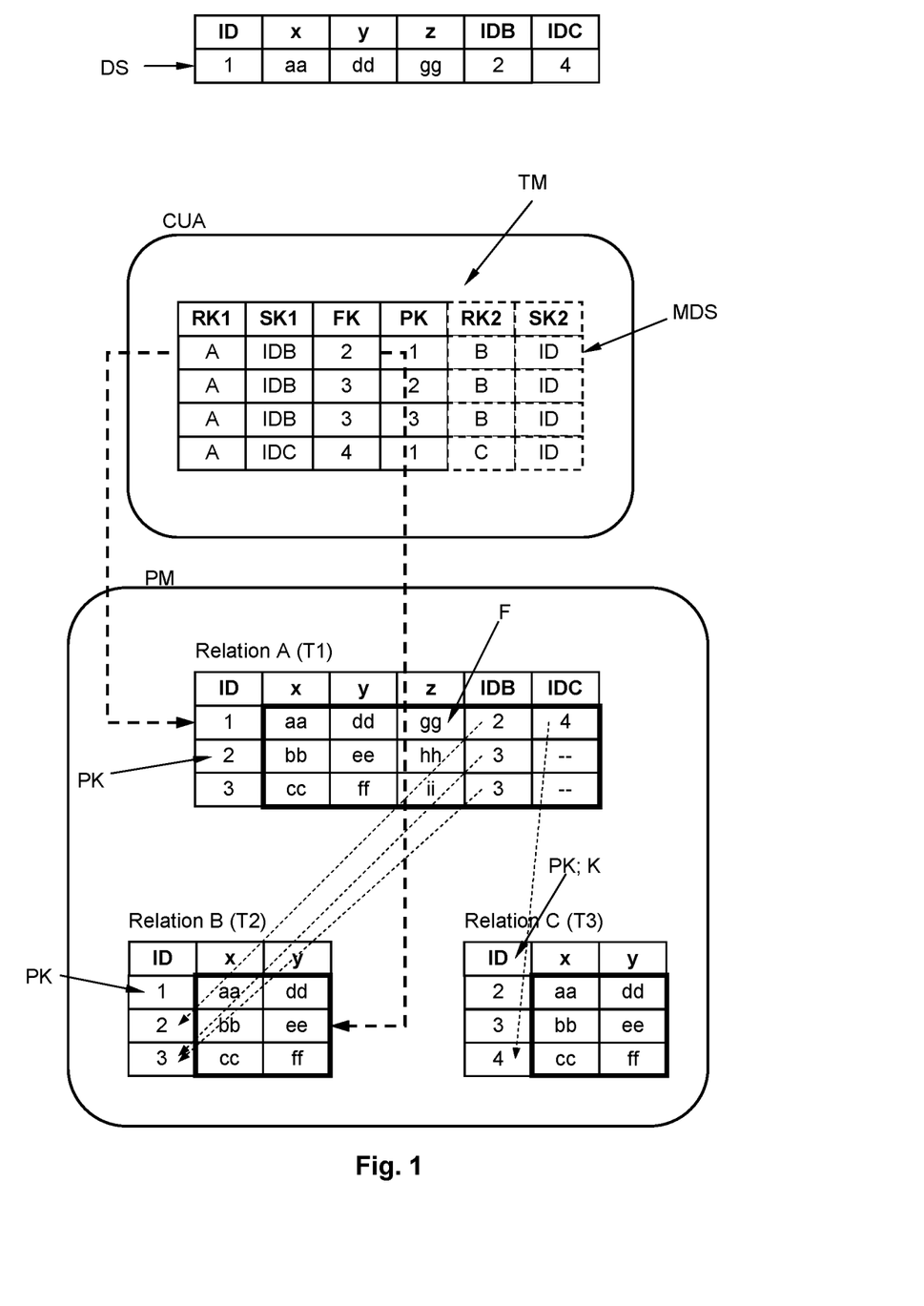
FIG. 1—a first data structure example, illustrating a method in accordance with this disclosure.

FIG. 1 shows a data structure, wherein foreign key attribute values of dataset DS may be secured against unauthorized access advantageously.

Dataset DS is used to describe the method according to the present disclosure, wherein foreign key attribute data is protected against unauthorized access. The dataset includes a primary key (column ID), three attributes that are not primary or foreign key attributes (columns x, y, and z), a foreign key attribute (column IDB) that makes reference to a dataset in Relation B, and a further foreign key attribute (column IDC) making reference to a dataset in Relation C.

The system, in which said dataset and its respective references to Relations B and C are stored for access via an application not illustrated here, comprehends a volatile memory (CUA) and a non-volatile, i.e. permanent memory (PM). The volatile CUA memory is an integral part of a tamper-proof, sealed infrastructure that ensures that any unauthorized access to the volatile CUA memory is excluded technically. The secured and sealed infrastructure may include a number of redundant and distributed computer resources, which, in turn, may include various so-called trusted platform modules (TPM), performance switches that turn off the power of all computer resources, electro-mechanical locks, and a number of sensors that survey the access to the computer resources.

According to the present embodiment, the mapping relation TM is stored in the volatile CUA memory and may, at the same time, be a table of a database stored in the volatile CUA memory. The aforementioned database can be, for example, an in-memory database (IMDB) that stores your data in the volatile CUA memory. The data stored in the volatile CUA memory may be replicated in a further volatile memory not illustrated here, and the latter additional volatile memory may again be part of a further secured, sealed infrastructure.

The volatile CUA memory may also store cryptographic keys enabling the encryption and decryption of dataset DS.

According to the present embodiment, mapping relation TM is always stored in the volatile CUA memory only, so that mapping relation TM is deleted fully, the instant the power supply is interrupted. If and when cryptographic keys are stored in the volatile CUA memory, these are also deleted completely upon power-off. Deletion of mapping relation TM may be necessary, for example, if a party gains unauthorized access to a computer resource constituting an element of the sealed infrastructure.

In order to be able to detect unauthorized access to the sealed infrastructure, the computer resources of the sealed infrastructure are connected to a sealing control unit, that monitors the electromechanical components. If the sealing control unit detects unauthorized access to a computer resource, it can deactivate the power to the compromising computer resource and the volatile CUA memory. Hence, no mapping relation TM data may be created, and access to cryptographic keys stored in the volatile CUA memory is prevented. The sealing control unit may also be adjusted to recognize unauthorized access to the sealed infrastructure through a data network.

This interrupts the power to the compromised computer resources and volatile CUA memory in this case, as well.

According to the present embodiment, the power to the sealed infrastructure's computer resources and the volatile memory is also deactivated, if and when maintenance in the sealed infrastructure becomes necessary. This ensures that even the provider of the sealed infrastructure, i.e. of the database in which the mapping relation TM is stored, has no means of accessing mapping relation TM.

Moreover, the present embodiment foresees, that an application, e.g. a software application that must access data in mapping relation TM, operate in the sealed infra-structure only. As a result, respectively certified applications can warrant that none of the data stored in mapping relation TM is accessible to unauthorized parties via said applications.

The permanent, i.e. non-volatile PM memory stores user and master data of dataset DS. The aforementioned data may be stored in a database management system. In order to prevent unauthorized access to the foreign key attributes of dataset DS in the non-volatile memory PM, the foreign key attributes are stored in mapping relation TM in the volatile CUA memory only.

According to the present embodiment, the aforementioned foreign key attributes are merely stored further in the non-volatile, i.e. permanent memory PM, in order to recover the mapping relation TM in the volatile CUA memory, if the power to the volatile CUA memory was disconnected, e.g. due to a detected compromise at-tempt. However, the following elucidated security measures warrant that the provider of the database stored in the permanent memory PM cannot access the values of said foreign key attributes at any time.

In the example in FIG. 1, which illustrates a data structure that protects a dataset's foreign key attribute values against unauthorized access, the database in the non-volatile, i.e. permanent memory PM, features three relations (Relation A, Relation B, and Relation C). A relation is colloquially also called a table or database table. Dataset DS is stored in Relation A. The dataset DS stored in Relation A (dataset ID=1), shows a foreign key (IDB) with the value 2 and a further foreign key (IDC) with the value 4. In the contemplated example, the foreign key IDB references to Relation B, wherein the value of the foreign key IDB makes reference to dataset ID=2 in Relation B. The second foreign key (IDC) makes reference to Relation C, wherein value 4 of foreign key IDC gives reference to the dataset with the ID=4 in Relation C. The references (i.e. connections) made between Relations B and C and Relation A are so-called 1:n connections, wherein the present embodiment and its respectively necessary data structures are also applicable to 1:1 connections and/or n:m connections.

A mapping dataset MDS, pertaining to the dataset MDS in Relation A, is stored in the mapping relation TM. In the example in FIG. 1, mapping relation TM shows six attributes, i.e. six columns. Column RK1 stores a first relation ID, wherein said ID indicates the relation to which the mapping dataset MDS belongs. Value A, for example, indicates that the mapping dataset MDS belongs to Relation A.

A further column mentions storage of column ID SK1. The latter indicates what foreign key attribute of the first relation (provided by the first relation ID RK1) is stored in mapping dataset MDS.

Another column (SK) stores the value of the foreign key, which is referred to in the first column ID (RK1), in the relation which, in turn, is referenced by the first relation ID RK1.

Yet another column (PK) stores the value of the primary key attribute of dataset DS, which is stored in Relation A.

Consequently, the value of a particular foreign key attribute of a particular dataset in a particular relation may be identified via attributes RK1, SK1, SK, and PK. The example in FIG. 1 identifies (i.e. references), through the first mapping dataset MDS, the value of foreign key attribute IDB of dataset ID=1 in Relation A.

Since the mapping relation TM provides the first relation ID RK1 and the first column ID SK1, different relations' foreign key attribute values and values of different foreign key attributes of a relation may be stored in a single mapping relation TM. Because the mapping relation TM is stored in the volatile CUA memory, e.g. as database table of an IMDB, the access period to a defined mapping dataset MDS is limitable to a brief period (given, in particular, suitable index structures are provided), even if the number of mapping datasets is very high.

The dataset referenced from the first mapping dataset MDS in the mapping relation TM in Relation A is illustrated through the dashed arrow leading from map-ping relation TM to Relation A. The dataset referenced from the first foreign key attribute in the first mapping dataset MDS in Relation B is reflected by the dashed line leading from the foreign key attribute to Relation B.

An application not illustrated in FIG. 1 (that is put into effect in the sealed infra-structure and intends to access the first dataset in Relation A and break the foreign keys of the foreign key attributes IDB and IDC, e.g. via SQL inquiry join) identifies the foreign key attribute values of Relation A's first dataset in the mapping relation TM, by identifying the mapping datasets MDS in the mapping relation TM that correlate with these foreign key attributes. In the example in FIG. 1, this would identify, for the first dataset of Relation A, the first mapping dataset in mapping relation TM for foreign key attribute IDB and the fourth mapping dataset in relation TM for foreign key attribute IDC.

With the thus identified mapping datasets, the application has access to foreign key attribute values IDB and IDC of the first dataset of Relation A. As a result, it can create a respective SQL inquiry join. In other words, relations between datasets of multiple relations can be unlocked, without the foreign key attribute values having to be stored in the actual relations. Since the values of the foreign key attributes of a dataset do not have to be stored in the relations, it is ensured that, even if an unauthorized party or the PM database provider has access to the data stored in the relations, no information as to the relations between the datasets stored in said relations is disclosed to named parties. This also warrants that no meta-information may be deducted or obtained from the relations between the datasets stored in the relations, which could, for example, allow conclusions to be drawn as to the behaviour or activity of certain parties. If the example in FIG. 1, e.g., were to store user data in Relation A, wherein a mailbox is attributed to the respective user per foreign key attribute IDB, the provider of the database, e.g., could find out that a single mailbox (ID=3) is attributed to the users with the ID 2 and 3 alike. This, in turn, would disclose to the database provider, that some form of contact was established between said users and that named parties are possibly exchanging information through the mailbox attributed to them. Without the foreign key attributes in the Relation A datasets being disclosed to the data-base provider, information disclosing which mailbox is attributed to which user is not revealed to the database provider, nor can said provider deduct any meta-information or draw conclusions from such attribution.

In the data structure example illustrated in FIG. 1, the foreign key attributes, i.e. the values of the foreign key attributes IDB and IDC, are also stored in Relation A in the permanent memory PM. Storage of the values of the foreign key attributes in the relations in the non-volatile memory PM merely serves the purpose, to be able to recover the mapping relation TM in the volatile CUA memory, if and when necessary, e.g. in the event that the power to the volatile CUA memory is disconnected. Recovery of the mapping relation TM in the volatile CUA memory is described in detail with reference to FIG. 4.

In order to ensure that the provider of the database stored in the non-volatile (permanent) memory cannot access the values of the foreign key attributes IDB and IDC, present patent foresees that the values of the foreign key attributes are, in any event, encrypted cryptographically. To encrypt named foreign key attributes, the present embodiment utilizes exclusively cryptographic keys of the respective dataset owners. The aforementioned ensures that not even the database provider can decrypt a dataset's encrypted attributes.

In addition to the values of the foreign key attributes, further attributes (that do not constitute foreign key attributes or key attributes) may also be encrypted cryptographically via encryption key of the respective dataset owner. In the example illustrated in FIG. 1, the cryptographically encrypted attributes are marked with a bold frame, wherein not only the attributes of Relation A are encrypted, which include foreign key attributes, but also attributes of Relations B and C.

However, according to the present embodiment, the values of the primary keys PK of the respective datasets in the relations are not encrypted, since no information of any kind may be deducted from these values, anyway. Moreover, this ensures that the primary key attribute values do not have to be decrypted, first, before an SQL inquiry is created, which greatly redounds to the system's advantage in terms of speed.

Figure 2:
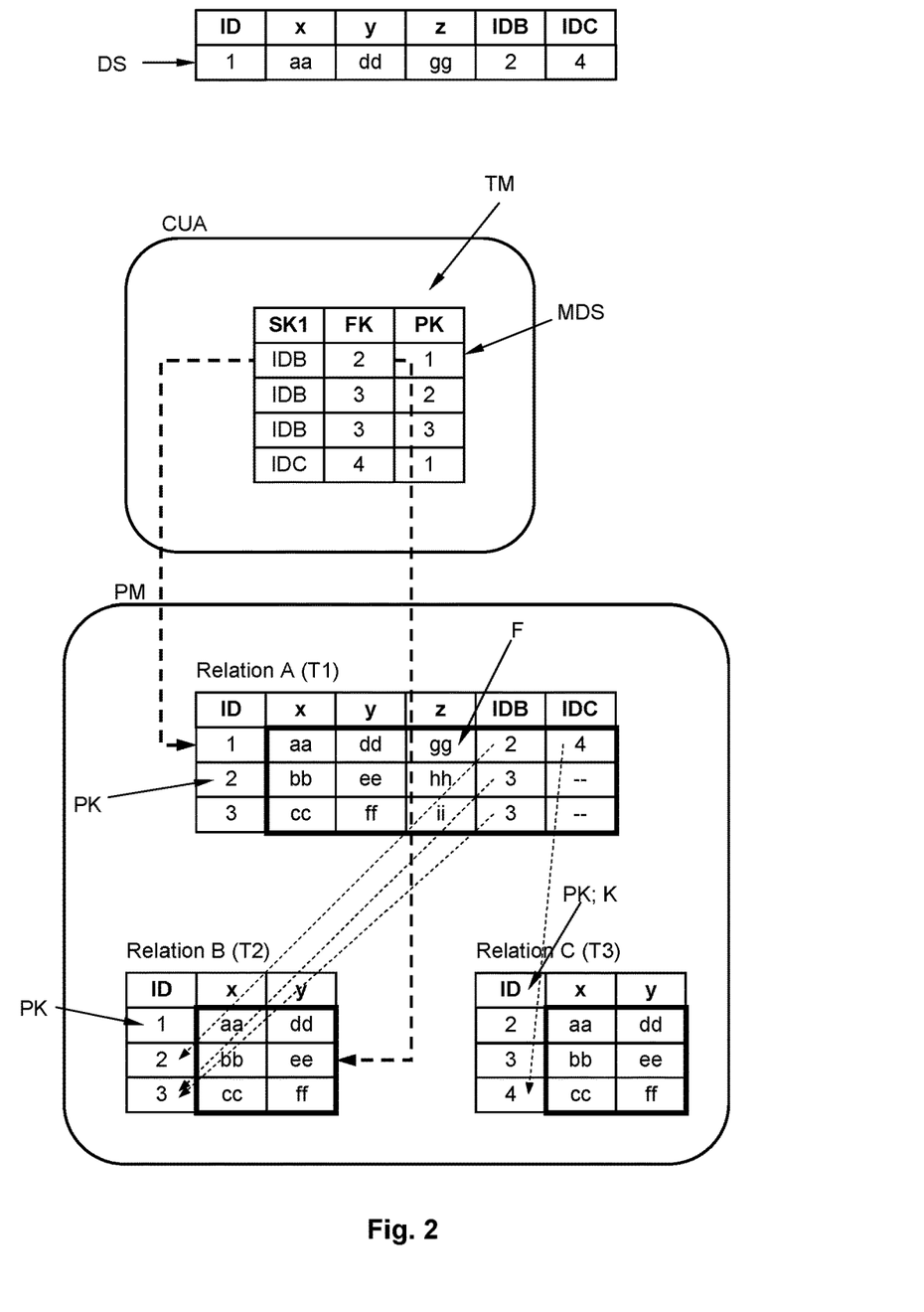
FIG. 2—a second data structure example, illustrating a second method.

FIG. 2 shows an alternative data structure, wherein the foreign key attribute values of a dataset are protected against unauthorized access. The Relations A, B, and C illustrated herein are identical with the data structure example according to the present embodiment illustrated in FIG. 1, i.e. named three relations include the same attributes and attribute values as those in FIG. 1.

The data structure according to the embodiment illustrated in FIG. 2 differs from the data structure in FIG. 1 as far as the structure of the mapping relation TM in the volatile CUA memory, is concerned. A further difference consists in the fact that, in the data structure example according to the embodiment illustrated in FIG. 2, a mapping relation TM is provided in the volatile CUA memory for each respective relation in the non-volatile, i.e. permanent memory PM that includes foreign key attributes. If, for example, three relations embody foreign key attributes in the permanent memory PM, then three mapping relations are also allotted to the volatile CUA memory. Since, in the example illustrated in FIG. 2, only Relation A includes foreign key attributes (IDB and IDC) in the permanent memory PM, merely one mapping relation TM is designated for the volatile CUA memory.

In contrast to the mapping relation illustrated in FIG. 1, that includes the values of all foreign key attributes of all relations, a mapping relation according to FIG. 2 records only the attribute values of foreign key attributes of a single relation. Instead, mapping relation TM includes three attributes, i.e. columns. A given first column stores a first column ID SK1, that specifies to which foreign key attribute the respective mapping dataset DS in the mapping relation TM refers. Let's assume the first mapping dataset (MDS) in mapping relation TM references to foreign key attribute IDB in Relation A. Since the volatile CUA memory is provided exactly one mapping relation TM for each relation with foreign key attributes, and since it is known which mapping relation in the volatile CUA memory is attributed to which relation in the permanent memory PM, the mapping relations can renounce an attribute that would indicate said correlation.

A further column of mapping relation TM stores the value of the foreign key at-tribute specified in the first column ID SK1. A third column stores the value of Relation A's primary key attribute PK, so that each mapping dataset MDS in map-ping relation TM is attributed exactly one dataset in Relation A. Owing to such unambiguous assignment, an application can, for instance, determine the value of the foreign key attribute IDB of the dataset with the primary key PK=1.

Based on the first column ID SK1, a mapping dataset MDS may be stored in mapping relation TM for each foreign key attribute value of Relation A. For instance, the first three mapping datasets store the values of foreign key attribute IDB, whereas the fourth dataset the value of foreign key attribute IDC.

An SQL inquiry join is created in the same manner as already elucidated in FIG. 1.

Figure 3:
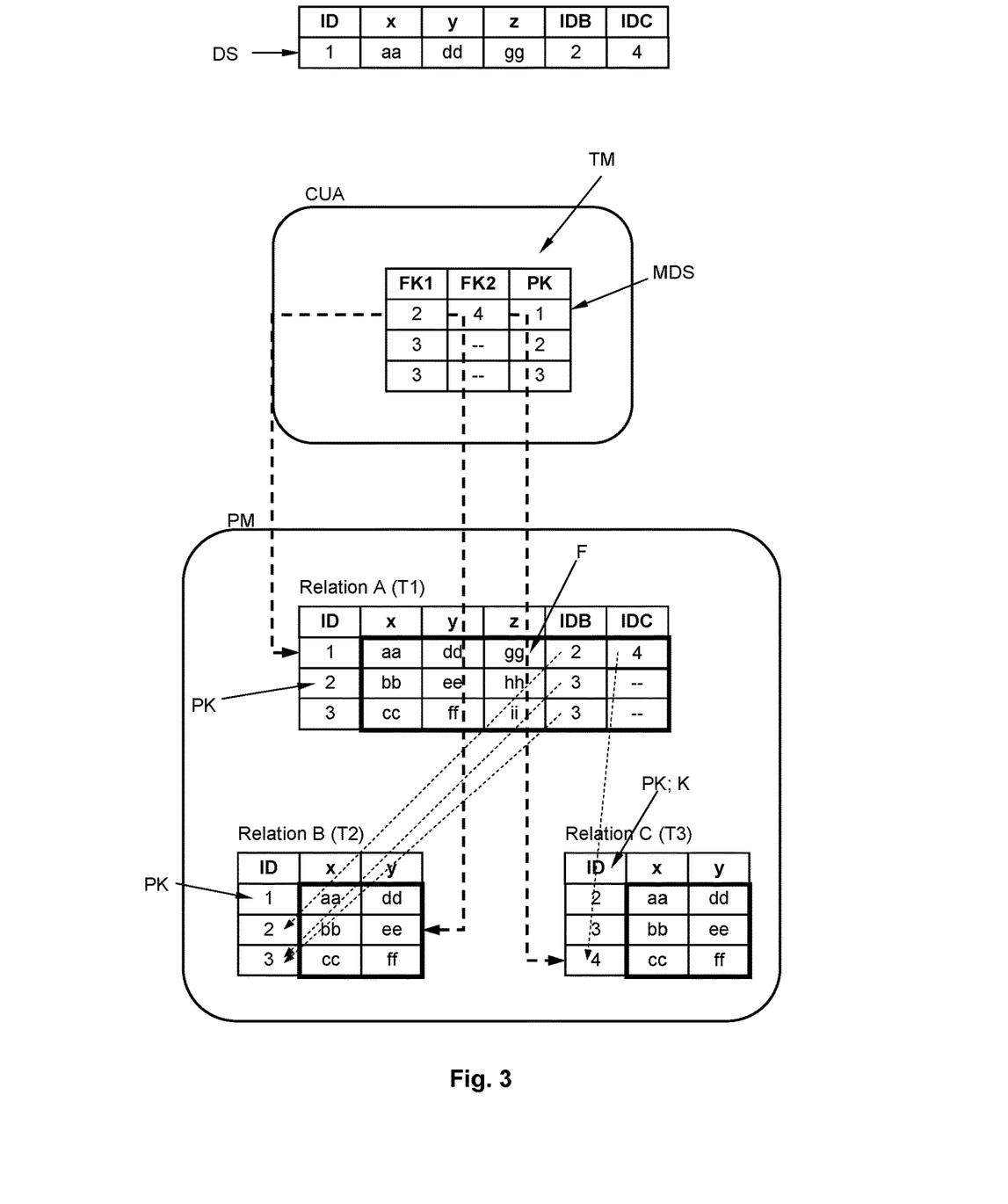
FIG. 3—a third data structure example, illustrating a third method.

FIG. 3 illustrates a further data structure model, intended for the protection of a dataset's foreign key attribute values against unauthorized access. Relations A, B, and C, which are stored in the non-volatile, i.e. permanent memory PM, are identical, in terms of structure and content, to Relations A, B, and C in FIG. 1 and FIG. 2.

As is the case in FIG. 2, the example in FIG. 3 also provides the volatile CUA memory a mapping relation TM for each relation in the permanent memory PM that includes foreign key attributes. However, as opposed to the example illustrated in FIG. 2, in the data structure exemplified in FIG. 3, the values of all foreign key attributes of a Relation A dataset are stored in a single mapping dataset MDS in mapping relation TM. Since all attribute values of the dataset foreign key at-tributes of Relation A are stored in a single mapping dataset DS, the mapping relation TM illustrated in FIG. 3 can dispense with the first column ID SK1.

The primary key PK references the mapping dataset MDS to a dataset in Relation A. The further columns SK1 and SK2 of mapping relation TM store the values of foreign key attributes IDB and IDC for the respective Relation A dataset identified by foreign key PK. Therefore, the number of columns, in which foreign key attribute values are stored in mapping relation TM, varies, depending on the number of relations in the permanent memory that refer to the respective mapping relation.

Figure 4:
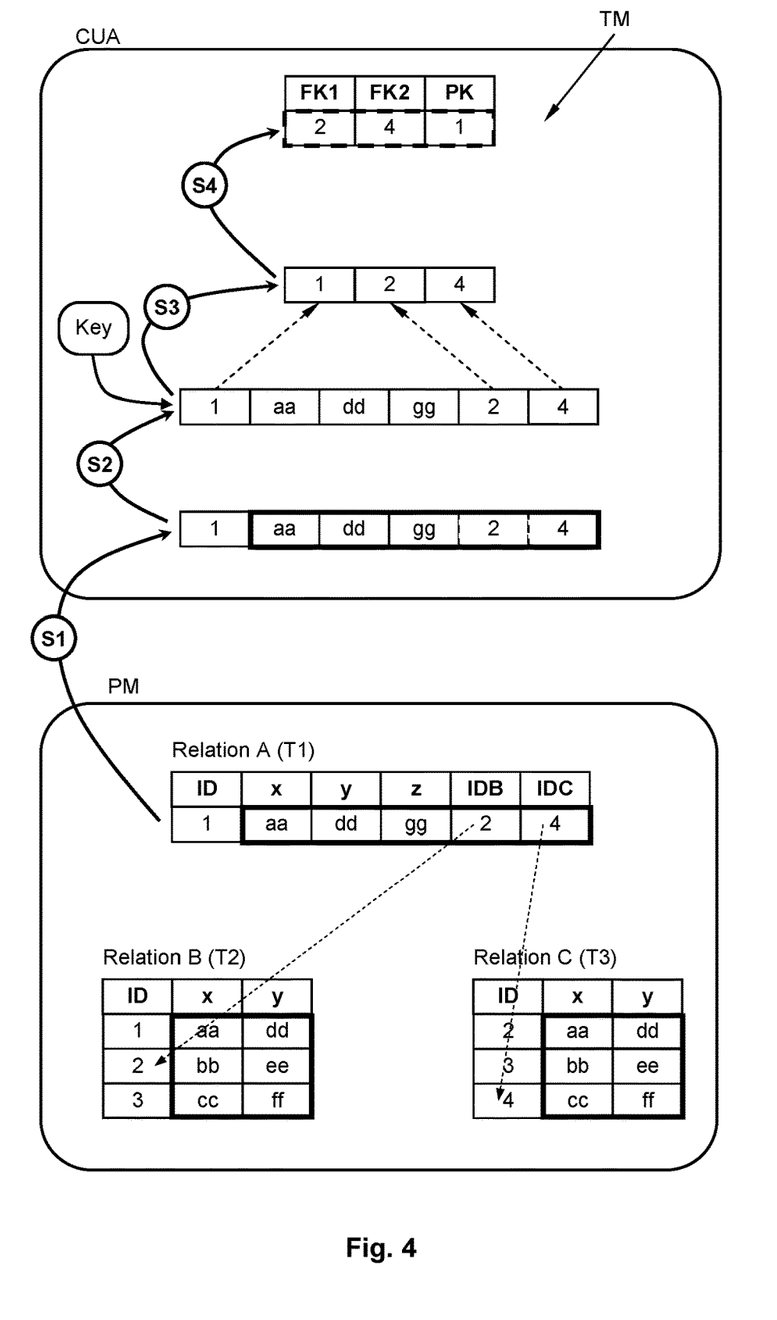
FIG. 4 shows a Relation in the permanent memory PM that depicts a dataset, for which a respective mapping dataset must be recovered in mapping relation TM.

FIG. 4 describes, on the basis of a dataset stored in Relation A, the method according to an embodiment wherein a mapping relation TM is created and/or recovered in the volatile CUA memory.

As mentioned previously with reference to FIG. 1, the mapping relations TM stored in the volatile CUA memory can be replicated to a redundant volatile memory. Said redundant volatile memory may be located in the same sealed infrastructure or in a further sealed infrastructure.

In the event that the power of the volatile CUA memory is disconnected, e.g. due to compromise or for maintenance purposes, and all data in the volatile CUA memory is deleted, mapping relations may be copied from the redundant volatile memory to the volatile CUA memory. If, however, the power of all volatile memory is turned off, the mapping relations in the volatile memory and, if applicable, in the redundant volatile memory, have to be recovered through the relations stored in the permanent memory PM.

FIG. 4 shows a Relation A in the permanent memory PM that depicts a dataset, for which a respective mapping dataset must be recovered in mapping relation TM.

The dataset in Relation A features a primary key ID, the two foreign key attributes IDB and IDC, and three attributes, x, y, and z, that do not constitute foreign key attributes nor other key attributes. In the example illustrated in FIG. 4, the foreign key attributes and non-key attributes were encrypted with a cryptographic key belonging to the dataset owner. Nonetheless, according to the present embodiment, merely the foreign key attribute values need to be cryptographically encrypted with the key of the dataset owner.

In a first step, S1, the dataset of Relation A is copied to the volatile CUA memory of the sealed infrastructure. This is necessary, because the dataset and, at any rate, the dataset's foreign key attribute values, must be decrypted, in order to be able to create, i.e. recover, the mapping relation. The aforementioned dataset decryption occurs within the secured, hermetically sealed infrastructure. This ensures that the foreign key attribute values exist in unencrypted form in the sealed infrastructure's volatile CUA memory only. If the sealed infrastructure and/or the volatile CUA memory were compromised during recovery of mapping relation TM, the unencrypted foreign key attribute values would also be instantly deleted.

In a further step, S2, the dataset copied into the volatile CUA memory is decrypted. The cryptographic key (decryption key) attributed to the dataset owner is applied in the process, to decrypt said data. It is important to mention, at this point, that the cryptographic keys attributed to the dataset, with which the dataset is decrypted, are stored exclusively in the sealed infrastructure, i.e. per volatile CUA memory only.

Since the cryptographic key with which to decrypt the dataset is used by the cryptographic key owner only (because the owner of said cryptographic key has to enter, for example, a password, in order to be able to use it), the dataset in the volatile CUA memory may only be decrypted, if the dataset owner is logged on to the system. Hence, neither the provider of the sealed infrastructure nor the provider of the database stored in the permanent memory PM can recover the mapping relations stored in the volatile CUA memory without the help of the owner of the datasets stored in the respective relations, since neither the sealed infrastructure provider nor the database provider can use the dataset owner's cryptographic keys, which are necessary to recover said relations. Consequently, neither the sealed infrastructure provider nor the database provider can recover all the mapping relations, for example per batch job. Recovery of mapping relations in the volatile CUA memory can only occur in stages, in which the mapping relations of those datasets in the database are recovered, that are attributed to a logged on party, i.e. an owner or user authenticated by the system.

Upon completion of step S2, the dataset in the volatile CUA memory is presented in unencrypted form. In a further step, S3, values are extracted from the decrypted dataset, that are necessary for the creation of a respective mapping dataset in the mapping relation TM. In the example illustrated in FIG. 4, said values are those of the primary key ID and the values of the foreign key attributes IDB and IDC. If the mapping relation TM, that is to be recovered, bears the data structure of FIG. 1 or FIG. 2, the additional attribute values required for recovery must also be identified in step S3. The data structure illustrated in FIG. 4 would also require, for instance, identification of the first column ID SK1 in step S3, in order to be able to enter a respective mapping dataset into the mapping relation shown in FIG. 2.

Once the attribute values have been identified, and entry of the mapping dataset in the mapping relation postulates the latter, then the attributes, i.e. the thus created mapping dataset MDS is entered in the mapping relation TM in step S4. Subsequently, any dispensable data, e.g. the decrypted dataset in the volatile CUA memory, may be deleted.

Steps S1 to S4 are repeated for every dataset in all relations comprising foreign key attributes.

Before the dataset is copied to the volatile CUA memory in step S1, or before the dataset copied to the RAM in step S2 is decrypted, the present embodiment allows verification of whether a mapping dataset already exists for named dataset in the respective mapping relation TM. If no such mapping dataset exists, recovery is resumed. In the opposite event, recovery procedures may be interrupted.

Once all the mapping relations have been recovered in the volatile CUA memory, it has proven advantageous to copy the mapping relations stored in the volatile CUA memory to one or more redundant RAMs.

Steps S1 to S4 are also fulfilled, if and when a new dataset is added to a relation in the permanent memory PM. A mapping dataset must also be fed to the respective mapping relation for such a newly added dataset, in order for the foreign key attribute values of the new dataset to be protected against unauthorized access.

If the value of a dataset's foreign key attribute in the non-volatile memory PM changes, the modified value of the foreign key attribute must also be modified in the respective mapping dataset. Steps S1 to S3 are executable for this purpose in the same manner as with mapping relation recovery. However, instead of an insert operation, step S4 foresees an update operation, wherein an existing mapping dataset is substituted by the mapping dataset created in step S3. Such mapping dataset updates primarily apply only to cases in which the foreign key attribute value of a dataset has changed. If, in contrast, only the value of a non-key attribute changes, then no mapping relation update is performed.

Hence, the embodiments described allow foreign key attribute values of datasets, that may be stored in a database, to be protected against unauthorized access effectively and efficiently, by ensuring that the values of the foreign key attributes of the datasets are stored per volatile memory only, wherein named RAM represents a constituent part of a secured, sealed infrastructure.

Unlocking foreign key attributes of a dataset postulate that an application accesses the random access memory in the sealed infrastructure, yet said application also runs exclusively within the sealed infrastructure. Consequently, named application can not disclose any information whatsoever in relation to the values of the foreign key attributes, either.

Moreover, the values of the foreign key attributes are also stored in the datasets, to recover the mapping relations stored in the volatile, i.e. random access memory, whereby named mapping relations only need be recovered from the datasets, if and when. Besides the RAM, all redundant volatile memories were deleted, as well.

In order to ensure that all possible access to the values of the foreign key attributes stored in the datasets is excluded, the values of said foreign key attributes are, in any event, encrypted with a cryptographic key that belongs or is attributed to the dataset owner. Hence, not even a database provider can decrypt the foreign key attribute values of a dataset.

Abbreviations

CUA Volatile clean-up area memory
CUA2 Redundant, volatile, clean-up area memory
DS Dataset in the first and/or second relation (T1, T2)
F Attributes of the first and/or second relation (T1, T2), that are not foreign key attributes
FK, FK1, FK2 Foreign key attributes
K Keys of dataset DS (e.g. primary keys or composite primary keys)
MDS Mapping dataset in mapping relation TM
PK Primary key attribute of the first and/or second relation (T1, T2)
PM Non-volatile, i.e. permanent memory
RK1 First relation ID in mapping relation TM
RK2 Second relation ID in mapping relation TM
S1 to S4 Data recovery steps
SK1 First column ID in mapping relation TM
SK2 Second column ID in mapping relation TM
T1 First relation (table) of a database in the permanent memory PM
T2 Second relation (table) of a database in the permanent memory PM
TM Mapping relation (table) of a database in the volatile CUA memory

What is claimed is:

1. A method for protecting the values of attributes of a dataset (DS), that are stored in a first relation (T1) of a database, against unauthorized access, wherein a foreign key attribute value (FK) of the dataset refers to a key (K) of the first relation (T1) or a second relation (T2), wherein
the foreign key attribute value (FK) is stored in a mapping relation (TM),
the values of a number of attributes (F) of a dataset, that are not foreign key attributes, are stored in the first relation (T1),
the first relation (T1) is stored in a permanent memory (PM),
the mapping relation (TM) being stored in a volatile (CUA) memory only in a secured, hermetically sealed infrastructure, so that mapping relation (TM) is deleted fully, the instant the power supply is interrupted,
cryptographic keys enabling the encryption and decryption of dataset (DS) are stored in the volatile (CUA) memory only, so that the cryptographic keys are deleted fully, the instant the power supply is interrupted, and
computer resources of the sealed infrastructure are connected to a sealing control unit that monitors electromechanical components of the computer resources and the sealed infrastructure, wherein the sealing control unit deactivates the power supply to the volatile memory (CUA) if the sealing control unit detects unauthorized access to the computer resource.

2. The method of claim 1, wherein the value of a primary key attribute (PK) of the dataset (DS) is stored, in addition to the value of the foreign key attribute (FK), in the mapping relation (TM), wherein the foreign key attribute value (FK) and the primary key attribute value (PK) of the dataset (DS) create a mapping dataset (MDS) in the mapping relation (TM).

3. The method of claim 1, wherein a primary key attribute (PK) of the dataset (DS) is derived from a number of key attributes of the dataset (DS).

4. The method of claim 1, wherein the following is stored, in addition, for each respective mapping dataset (MDS) in the mapping relation (TM), given multiple first relations (T1), in which datasets (DS) comprising foreign key attribute values may be stored:
a first relation ID (RK1), which comprises information referring to which first relation (T1) of the multiple first relations the respective mapping dataset (MDS) is attributed, and
a first column ID (SK1), which comprises information referring to which of the dataset's (DS) foreign key attributes (FK) the foreign key attribute value stored in the mapping dataset (DS) is attributed.

5. The method of claim 1, wherein, given multiple relations in the volatile (CUA) memory, in which datasets (DS) comprising foreign key attribute values may be stored, a mapping relation (TM) is created for each of the first relations (T1), wherein the foreign key attribute values (FK) of the respective datasets (DS) and the value of the primary key attribute (PK) are stored in named mapping relation (TM), in addition to the dataset's (DS) foreign key attribute value (FK).

6. The method of claim 5, wherein the mapping relation (TM) stores, in addition, a first column ID (SK1) for each mapping dataset (MDS), which comprises information referring to which of the dataset's (DS) foreign key attributes (FK) the foreign key attribute value stored in the respective mapping dataset (MDS) is attributed.

7. The method of claim 4, wherein the following is stored, in addition, in the mapping relation (TM) for each respective mapping dataset (MDS):
a second relation ID (RK2), which comprises information as to which second relation (T2) is referenced by multiple second relations of the mapping dataset's (MDS) foreign key attribute value, and
a second column ID (SK2), which comprises information as to which key (K) is referenced by the mapping dataset's (MDS) foreign key attribute value in the second relation (T2).

8. The method of claim 1, wherein the first relation (T1) stores, in addition, the dataset's (DS) value of the foreign key attribute (FK), wherein the dataset's (DS) value of the foreign key attribute (FK) is encrypted cryptographically, preferably via a cryptographic key attributed to the dataset owner.

9. The method of claim 8, wherein a value of at least one of the dataset's (DS) further attributes (F), that is not a foreign key attribute, is encrypted cryptographically, in addition to the value of the foreign key attribute (FK).

10. The method of claim 9, wherein the value of the new dataset's (DS) foreign key attribute values (FK) and primary key attribute values (PK) are stored in the mapping relations (TM), and wherein, in any event, the values of the foreign key attributes (FK) in the first relation (T1) are encrypted cryptographically, when a dataset (DS) is created.

11. The method of claim 10, wherein the mapping relations (TM) are stored, in addition, in a redundant volatile CUA memory (CUA2).

* * * * *